(12) United States Patent
Karpov et al.

(10) Patent No.: US 6,508,435 B1
(45) Date of Patent: Jan. 21, 2003

(54) METHOD FOR CONTROLLING AN AEROSPACE SYSTEM TO PUT A PAYLOAD INTO AN ORBIT

(75) Inventors: Anatoly Stepanovich Karpov, ulitsa Kropotkina, d.1, kv.128, 394030 Voronezh (RU); Vladimir Sergeevich Rachuk, ulitsa Sredne-Moskovskaya, d.69, kv.125, 394030 Voronezh (RU); Robert Konstantinovich Ivanov, ulitsa Semashko, d.26, korpus 1, kv.204, 141014 Moskovskaya oblast, Mytischi (RU); Jury Vladimirovich Monakhov, Korolev (RU); Mikhail Markovich Kovalevsky, Moscow (RU); Andrei Vladimirovich Borisov, Korolev (RU)

(73) Assignees: Anatoly Stepanovich Karpov, Voronezh (RU); Vladimir Sergeevich Rachuk, Voronezh (RU); Robert Konstantinovich Ivanov, Moskovskaya oblast (RU)

( * ) Notice: Subject to any disclaimer, the term of this patent is extended or adjusted under 35 U.S.C. 154(b) by 0 days.

(21) Appl. No.: 10/048,174
(22) PCT Filed: Jul. 29, 1999
(86) PCT No.: PCT/RU99/00259
§ 371 (c)(1),
(2), (4) Date: Jan. 29, 2002
(87) PCT Pub. No.: WO01/08974
PCT Pub. Date: Feb. 8, 2001

(51) Int. Cl.$^7$ .............................. B64G 1/14; B64G 1/40
(52) U.S. Cl. ............................ 244/2; 244/63; 244/172
(58) Field of Search ........................ 244/2, 63, 158 R, 244/172

(56) References Cited

U.S. PATENT DOCUMENTS 4,901,949 A   2/1990   Elias
5,279,199 A   1/1994   August (List continued on next page.)

FOREIGN PATENT DOCUMENTS

| DE | 2428402 | 1/1976 |
|----|---------|--------|
| RU | 2026798 | 1/1995 |
| RU | 2061630 | 6/1996 |
| RU | 2068169 | 10/1996 |
| RU | 2120398 | 10/1998 |

*Primary Examiner*—Robert P. Swiatek
(74) *Attorney, Agent, or Firm*—Burns, Doane, Swecker & Mathis, L.L.P.

(57) ABSTRACT

Aerospace technology, in particular, methods for orbital injection of payloads (communication satellites, monitoring satellites, etc.) into low and medium earth orbits with the aid of aerospace systems comprising a carrier aircraft (CA) and a launch vehicle (LV) with a payload (PL). In the present method, after the CA 1 takeoff from the base aerodrome, its flight in the maximum cruising speed mode to the LV 2 launch area, pitchdown 7 of the CA 1 is effected to gain the maximum permissible horizontal flight speed, and at the moment that speed is attained, CA 1 pitchup 8 with the maximum allowable angle of attack is executed, culminating in transition to an angle of attack with a near-zero g-load (zero-gravity condition), with the pitchup parameters chosen so that at the LV 2 with PL 3 point of separation from the CA 1, the CA 1 has attained a speed $V_D$, flight altitude $H_D$ and a trajectory pitch angle $O_d$ ensuring a maximum PL 3 and a near-zero normal g-load 9. Separation of the LV 2 from the CA 1 is executed, imparting the LV 2 with a CA 1 related speed assuring that the LV 2 lags behind the CA 1 at a safe distance 10, then the LV 2 sustainers are fired, and, either prior to the sustainers' ignition, or after the ignition (by sustainers), the launch vehicle with the PL 3 is turned into a position differing form the vertical by an angle of 10–30 ° in the vertical plane in the launch direction 11. At the LV 2–PL 3 separation point 22, the CA 1 position is stabilized in an inertial coordinate system. The present invention makes it possible to safely, efficiently and with maximum payload capacity, place payloads into designated orbits and deliver payloads to given terrestrial and oceanic areas.

4 Claims, 1 Drawing Sheet

U.S. PATENT DOCUMENTS 5,402,965 A     4/1995  Cervisi et al.
5,456,424 A  * 10/1995  Palmer ........................ 244/172
5,564,648 A  * 10/1996  Palmer ................... 244/135 A
5,740,985 A  *  4/1998  Scott et al. ............... 244/137.4
6,068,211 A  *  5/2000  Toliver et al. .......... 244/158 R
6,193,187 B1 *  2/2001  Scott et al. ............. 244/158 R

* cited by examiner

METHOD FOR CONTROLLING AN AEROSPACE SYSTEM TO PUT A PAYLOAD INTO AN ORBIT

FIELD OF THE INVENTION

The invention relates to aerospace technology, in particular, to methods for orbital injection of aerospace systems to put different payloads, such as communication, navigation, and monitoring satellites (including ecology monitoring satellites) into low and medium earth orbits, as well as to promptly deliver payloads to remote terrestrial and oceanic areas.

BACKGROUND OF THE INVENTION

A method is known for orbital injection of payloads (PL) by an aerospace system (ASS) comprising a carrier aircraft (CA), a mid-stage booster, and an orbiter as a payload.

The method presumes the horizontal flight of a CA, its climb to an altitude of about 20 km and acceleration to a flight speed of 800–1100 km/h. After this speed is reached, the motors of the mid-stage booster are ignited and it is separated from the CA. Then the mid-stage booster accelerates and delivers the PL to the targeted orbital injection point, after which the PL separates from the booster (RU Pat. No. 2061630, IPC B64G 1/14 .

A drawback of this method is the risk of the mid-stage booster firing prior to its separation from the CA, as well as the impossibility to reach the whole system's potential weight-lifting capability because the mid-stage booster is fired in the CA horizontal flight mode.

A method is known for orbital injection, including a horizontal takeoff system comprising a tanker airframe with a powered separable aircraft (A/C).

This method is realized in the following manner. The horizontal takeoff of the whole system is provided by the A/C engines supplied with fuel from airframe tanks. After attaining the predetermined operating speed, the A/C separates from the airframe and enters the prescribed trajectory, and the airframe returns to Earth (RU Pat. No. 2120398, IPC$^6$B64G 1/14, applicant—DASA, a German company).

This method has the same disadvantages as the method described above, along with poor energetic efficiency due to the necessity of using the A/C sustainers to boost the entire airframe—A/C system off the ground, which results in an unjustified overweight of the A/C structure, and a loss in its load-carrying capacity.

A method is also known for putting an aerospace system, Rockwell International Corporation, into orbit (U.S. Pat. No. 5,402,965IPC$^6$ B64G 1/14). In accordance with this method, a carrier aircraft with a launch vehicle (LV), consisting of a winged first stage mated with a payload and a recoverable winged last stage, carries out horizontal flight to the LV launching point, the LV separates from the CA, the LV is fired into the scheduled trajectory, and the recoverable winged last stage is separated from the LV. The recoverable winged last stage inserts into orbit, performs the mission task, executes de-orbitation, atmospheric aerodynamic deceleration, and controlled aircraft-like landing at a designated aerodrome.

A drawback of this method is the necessity of employing a winged first stage of the LV and separating it from the CA in horizontal flight, which correspondingly increases the structure weight of the first stage of the LV and does not make it possible to realize the optimum initial kinematic launch parameters of the LV after the LV-CA separation.

The analog most similar to the proposed method is the method for orbital injection disclosed in U.S. Pat. No. 4,901,949, IPC$^6$ B64C 3/38, Orbital Sciences Corporation (PCT/US 89/00867, Mar. 8, 1989) (protected by RU Pat. No. 2026798, IPC$^6$ B64D 5/100, F42B 15/00).

This method is used for an aerospace system comprising a CA, a three-stage LV with a winged first stage, and a PL.

The method consists in that an LV is accelerated to the point of its launch in the flight trajectory of the CA, the direction of flight of the CA coinciding with the direction of launching the LV, horizontal separation of the LV from the CA takes place, the motor system of the first stage is fired after separation and after the LV is lagging behind the CA in a horizontal position, the LV is boosted with use of the aerodynamic lift force of the winged first stage and the thrust force of its motors, after which the winged first stage is separated, and the second stage if fired.

One of the drawbacks of this method of orbital injection is the necessity of employing a wing in the first stage of the LV, which increases the weight of its construction and complicates the simultaneous control of aerodynamic and reactive actuating devices. Ignition of the motor system of the first stage when the LV is in a horizontal position prevents the CA from executing, prior to the LV-CA separation, an optimal maneuver to achieve design kinematic motion parameters (altitude, speed, trajectory pitch angle) ensuring the maximum lifting capability of the LV in the predetermined launch trajectory point.

DISCLOSURE OF THE INVENTION

The object of the present invention is to enhance an aerospace system's lifting capacity when putting a payload into space and delivering it to any terrestrial and oceanic areas, to ensure reliable LV-CA separation, to provide safety for the plane and crew members when firing the sustainers of the first stage of the LV, and to reduce the cost of launching a payload.

This object is accomplished in a method for controlling an aerospace system to put a payload into an orbit, comprising starting a carrier aircraft with a launch vehicle and a payload on board from a base aerodrome, flying it to a launch vehicle launch area, separating the launch vehicle from and lagging it behind the carrier aircraft with subsequent launch of the launch vehicle to a predetermined trajectory point and separation of the payload from the launch vehicle, the carrier aircraft at the maximum cruising speed mode in the launch area of the launch vehicle performs a dive to gain a maximum permissible horizontal flight speed, at the moment that speed is reached by the carrier aircraft, pitchup is effected at the maximum possible angle of attack, terminating with transition to an angle of attack ensuring a near-zero normal g-loading, wherein the aforesaid pitchup parameters are chosen so as to be adequate to the achievement, at a preset time $t_p$, of a flight trajectory point where the design flight speed $V_D$, flight altitude $H_D$ and trajectory pitch angle $\phi_D$ provide the maximum launch vehicle payload, as well as to ensure subsequent flight of the carrier aircraft with allowable parameters both after separation of the launch vehicle and in the case of emergency non-separation of the launch vehicle, after the carrier aircraft reaches at a preset time $t_p$ a flight path point with $V_D$, $H_D$, $\phi_D$ parameters and with a near-zero normal g-load, the launch vehicle is separated from the carrier aircraft and imparted with a speed relative to the carrier aircraft equal to the design speed at which the launch vehicle lags behind the carrier aircraft at a safe distance at the moment the launch vehicle sustainers are ignited, and before the launch of the launch vehicle to a scheduled trajectory point, the launch vehicle mated with the payload is turned to a position differing from the vertical by an angle of 10–30" in the vertical plane in the launch direction.

The turn of the launch vehicle prior to its launch with the payload into a scheduled trajectory point is executed by sustainers after their ignition, or the turn of the launch vehicle prior to its launch with the payload into a scheduled trajectory point is executed by an additional jet engine prior to the sustainers' ignition. Separation of the launch vehicle from the carrier aircraft if effected, stabilizing the position of the carrier aircraft in an inertial coordinate system.

The object of the present invention is to enhance an aerospace system's lifting capacity when putting a PL into space, to ensure reliable separation of the LV from the CA, to provide safety for the plane and its crew members when firing the sustainers of the first stage of the LV, and to reduce the cost of developing an aerospace system and the cost of launching a payload.

BRIEF DESCRIPTION OF THE DRAWING

The essence of the invention is explained in the diagram of the aerospace system control shown in FIG. 1, where:
1—carrier aircraft with LV and PL on board;
2—launch vehicle;
3—payload;
4—horizontal takeoff of a CA from a base aerodrome;
5—section of CA flight to the LV launch area;
6—section of CA flight at maximum cruising speed;
7—section of CA pitchdown and achievement of maximum permissible horizontal flight speed;
8—section of CA pitchup with the maximum permissible angle of attack;
9—section of decrease of CA attack angle and transition to flight mode with a near-zero normal g-load (0–0.2 of gravity force);
10—section of unpowered LV flight and LV lagging behind the carrier aircraft at a safe distance;
11—section of LV pitch-around maneuver and achievement of optimum pitch angle to launch LV with PL to a scheduled trajectory point;
12—section of LV first stage burning;
13—section of LV last stage burning;
14—LV-PL separation;
15—trajectory of CA flight to landing aerodrome after ejection of PL from LV;
16—trajectory of carrier aircraft flight to landing aerodrome after abort of PL ejection from LV;
17—CA landing aerodrome;
18—LV launch area point;
19—pitchdown maneuver start point;
20—maximum permissible horizontal speed point of CA flight;
21—point of start of decrease of angle of attack of CA;
22—point of arrival at a present time $l_p$ of design values of speed $V_D$, altitude $H_D$, and inclination of flight trajectory $\phi_D$ parameters, achievement of a near-zero normal g-load of the CA, and subsequent LV ejection with design speed of lagging relative to the CA;
23—point of arrival of LV at a safe distance point relative to the CA and point of start of LV pitch-around maneuver;
24—point of LV reaching optimum pitch angle differing from the vertical by an angle of 10–30° in the vertical plane along the launch direction;
25—point of jettisoning LV propellant components (if LV ejection aborted);
26—point of LV first stage separation and second stage ignition;
27—point of LV fairing separation;
28—point of LV last stage burnout and PL separation.

BEST METHOD OF CARRYING OUT THE INVENTION

Figure 1:
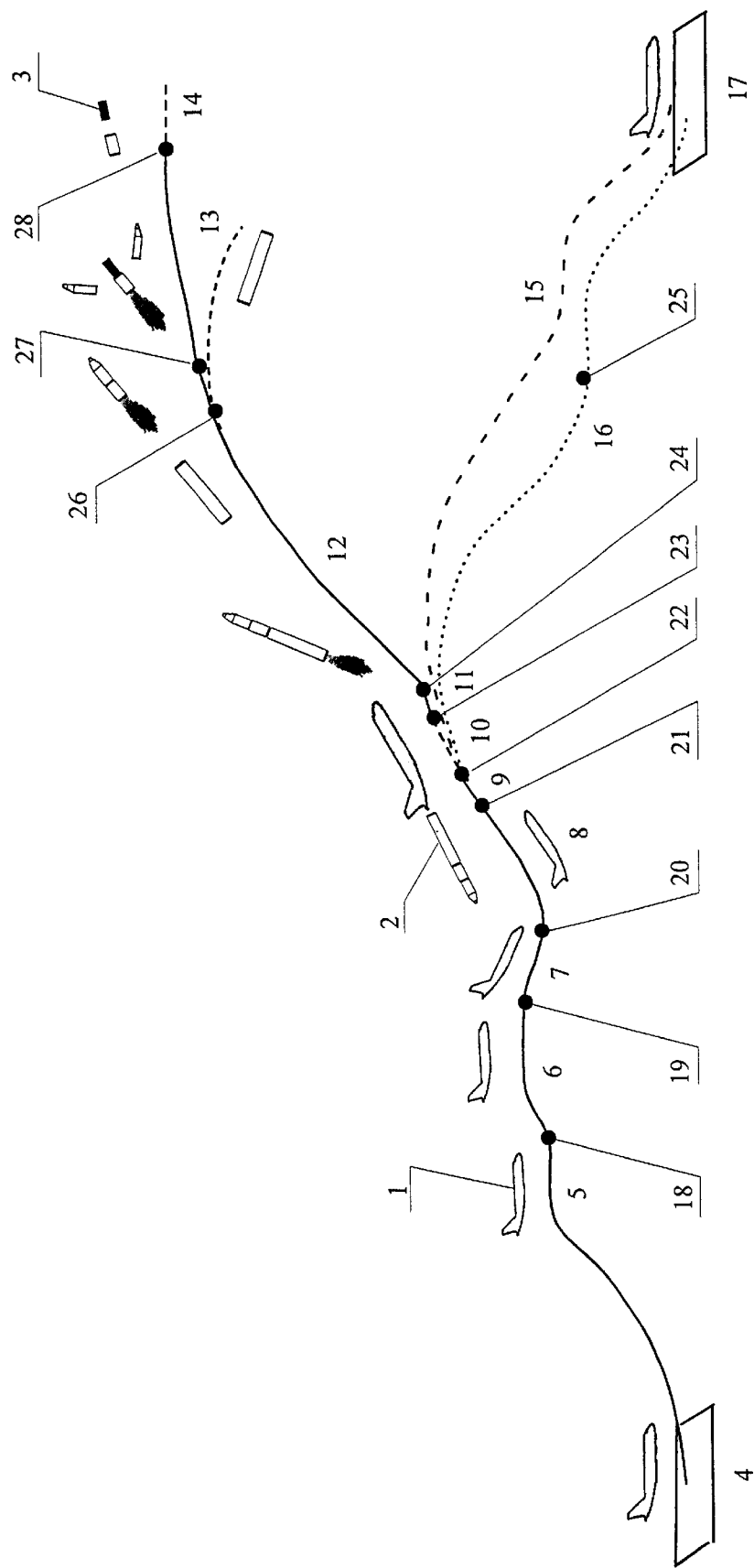

The proposed method for controlling the flight of an aerospace system is realized in the following manner.

After a CA 1 with LV 2 and PL 3 on board takes off from a base aerodrome 4 and the CA 1 flies to an LV launch area 5, when the launch area is reached (point 18), the CA switches to the maximum cruising speed mode (section 6).

When the design point 19 of the flight at maximum cruising speed mode is reached, the carrier aircraft 1 begins the pitchdown maneuver and the flight speed increases to the maximum permissible horizontal speed (section 7).

When the maximum permissible horizontal flight speed is reached (point 20), the CA 1 switches to the pitchup mode with the maximum permissible angle of attack (section 8), culminating in the transition (point 21) to an angle of attack ensuring a near-zero g-load acting on the CA 1 (section 9).

When at a preset time $t_p$, the design flight speed $V_D$, flight altitude $H_D$, trajectory pitch angle $\phi_D$, and a near-zero g-load (0–0.2 gravity force) acting on the CA 1, are reached, the LV 2 is separated from the CA 1 with a predetermined speed of lagging relative to the CA 1 (point 22).

After separation of the LV 2 and its lagging behind the CA 1 in the unpowered flight mode (section 10) at a predetermined safe distance (point 23), the LV 2 pitch-around maneuver is executed until the optimum pitch angle is reached to launch LV 2 with PL 3 to a scheduled point of trajectory flight (section 11). The pitch-around maneuver may be executed either by sustainers after their ignition or by an additional jet engine prior to the sustainers' ignition.

After the optimum pitch angle of the LV, differing from the vertical by an angle of 10–30" in the vertical plane in the launch direction is reached (point 24), active flight of the LV first stage is effected (section 12), followed by separation of the LV first stage (point 26), active flight of LV transtages (section 13), fairing separation (point 27), final stage burnout (point 28), and PL–LV separation (section 14).

After the LV 2 is ejected (point 22), the CA flies along trajectory 16 to the landing aerodrome.

If the separation of LV 2 with PL 3 from CA 1 at the preset time $t_p$ (point 22) is aborted, the CA with the LV and PL on board flies along trajectory 16 to the landing aerodrome. To ensure the safety of the CA 1 and crew members thereof, the LV propellant is jettisoned overboard (point 25) and the CA with empty LV and PL tanks lands at the aerodrome 17.

The technical result of the present invention is the provision of the possibility to augment the LV 2 gross launch weight owing to the ejection of the LV during the CA 1 flight modes with a near-zero g-load (near zero-gravity condition), which makes it possible to ensure the CA trim and control by means of available aerodynamic flight control devices when the LV is moving and by imparting it with the design speed of lagging behind the CA 1.

The augmentation of the LV 2 gross launch weight and the attainment, at the preset time $t_p$, of the design flight speed $V_D$, altitude $H_D$ and trajectory pitch angle $\phi_D$ parameters, providing for a maximum launch vehicle payload, make it possible, as a result of successive pitchdown and pitchup maneuvers, to achieve the aerospace system's maximum lifting capacity when putting a PL into orbit.

The separation of the LV 2 from the CA 1 during the near-zero g-load flight mode with the LV being imparted with a speed of lagging behind the CA 1, equal to the design speed of the LV lagging behind the CA at a safe distance, at the launch vehicle sustainer' ignition time, provides for reliable LV-CA separation with minimum loading, as well as safety for the carrier aircraft and its crew members when the sustainers of the first stage are fired at a safe distance.

The proposed method for controlling the aerospace system to put a payload into an orbit makes it possible to dispense with the need to create aerodynamic flight devices (wings, fin) on the LV to control its powered flight, and thus to simplify the LV structure, to eliminate expenditures on these devices' development, testing and manufacturing and, consequently, to reduce the aerospace system development costs and payload launch costs.

Industrial Applicability

By way of illustration, an embodiment of the proposed method for controlling an aerospace system is given below. The system employs and AN-124-100 Ruslan heavy transport aircraft as the carrier aircraft and a liquid-fuel two-stage LV with pollution-free propellant components (LOX/kerosene). The launch vehicle has a weight of 80–100 t, and sustainer-controlled pitch, roll and yaw. The LV payload capacity to the baseline polar orbit is 2–3 t. The LV ejection from the CA is effected through the use of a transport and launch container fitted with a pneumatic system.

Following the liftoff from the base aerodrome 4 and arrival at the LV launch area, the CA switches to the maximum cruising speed mode at an altitude of about 10 km and at a speed of about 830–845 km/h.

At 35–40 s prior to the scheduled LV ejection time, the CA beings a pitchdown and after 12–17 s reaches the maximum permissible horizontal speed M=0.8–0.81, wherewith the flight altitude decrease to 9.5–9.7 km.

After the maximum permissible horizontal speed is reached, the CA switches to the pitchup flight mode with the maximum permissible angle of attack, varying at the pitchup section from 7° at the beginning to 11.5° at the end, while the flight speed decreases to M=0.62, the altitude increases to 10.5–11 km and the trajectory pitch angle reaches 27–29°.

At 35–40 s prior to the scheduled LV ejection time, the CA begins transition to small angles of attack and to a reduction of the normal g-load down to near-zero values. Wherewith, the angle of attack of the plane decrease to 2–2.5".

When the scheduled LV ejection time $t_p$ is reached, and a near-zero normal g-load is achieved, the LV is pushed out of the transport and launch container by the pneumatic ejection system with the design speed of the LV for lagging behind the carrier aircraft. Wherewith, the CA has design values of speed $V_D$=0.6 M, altitude $H_D$=11–11.4 km, and trajectory pitch angle $\phi_D$~20–25 °, which serve to provide the maximum launch vehicle payload, as well as to ensure subsequent flight of the CA with permissible parameters both after successful LV separation and after LV separation abort.

After 5–6 s of unpowered flight and the LV lagging behind the CA at a safe distance (about 150 m), the LV sustainers are ignited and the LV pitch-around maneuver is executed with their aid to pitch angles of 10–30° from the vertical in a vertical plane along the launch direction, then the LV first stage burning is effected, followed by the LV first stage separation, LV second stage burning, fairing separation, second stage burnout, and PL——LV separation.

After LV ejection, or after an ejection abort (emergency situation), the CA flies to the landing aerodrome, with the LV propellant jettisoned overboard in the case of emergency situation, and the CA with empty LV tanks lands at the aerodrome.

The proposed control method makes it possible to achieve the maximum possible launch vehicle mass (up to 100 tons), the aerospace system's lifting capacity to a baseline (200 km) polar orbit to 3 tons, to ensure reliable LV-CA separation, to ensure the safety of the CA and its crew when firing the LV sustainers, to simplify the LV structure by dispensing with aerodynamic flight devices (wings, fin), and to reduce the expenditures on development and payload launch.

What is claimed is:

1. A method for controlling an aerospace system to put a payload into an orbit, comprising the steps of starting a carrier aircraft 1 with a launch vehicle 2 and the payload 3 on board from a base aerodrome 4, flying it to a launch area 5 of the launch vehicle, separating the launch vehicle from the lagging the launch vehicle 2 behind the carrier aircraft 1 with subsequent launch of the launch vehicle 2 to a predetermined trajectory point and separation of the payload 3 from the launch vehicle 2, wherein the carrier aircraft 1 at a maximum cruising speed mode 6 in the launch area 5 of the launch vehicle 2 performs a dive 7 to gain a maximum permissible horizontal flight speed, at a moment that speed is reached by the carrier aircraft, a pitchup 8 is effected at a maximum permissible angle of attack, terminating with a transition 9 to an angle of attack ensuring a near-zero normal g-loading, wherein said pitchup parameters are chosen so as to be adequate to the achievement, at a preset time $t_p$, of a flight trajectory point where a design flight speed $V_D$, a flight altitude $H_D$ and trajectory pitch angle $\phi_D$ provide a maximum launch vehicle 2 payload 3, as well as to ensure subsequent flight to the carrier aircraft 1 with allowable parameters both after separating the launch vehicle 2 and in the case of emergency non-separating the launch vehicle 2, after the carrier aircraft 1 reaches at the preset time $t_p$ a flight path point with $V_D$, $H_D$, $\phi_D$ parameters and with the near-zero normal g-loading, the launch vehicle 2 is separated from the carrier aircraft 1 and imparted with a speed relative to the carrier aircraft 1 equal to a design speed 10 at which the launch vehicle 2 lags behind the carrier aircraft 1 at a safe distance at a moment the launch vehicle 2 sustainers are ignited, and before the launch of the launch vehicle 2 to a scheduled trajectory point, the launch vehicle 2 mated with the payload 3 is turned 11 to a position differing from the vertical by an angle of 10–30° in a vertical plane in the launch direction.

2. The method according to claim 1, wherein turning of the launch vehicle 2 prior to its launch with the payload 3 into the scheduled trajectory point is executed by sustainers after their ignition.

3. The method according to claim 1, wherein turning of the launch vehicle 2 prior to its launch with a payload 3 into the scheduled trajectory point is executed by an additional jet engine prior to the sustainers ignition.

4. The method according to claim 1, wherein separating of the launch vehicle 2 from the carrier aircraft 1 is effected, stabilizing a position of the carrier aircraft in an inertial coordinate system.

* * * * *